United States Patent [19]
Waid et al.

[11] Patent Number: 5,831,177
[45] Date of Patent: Nov. 3, 1998

[54] FLUID DRIVEN SIREN FLOWMETER

[75] Inventors: Margaret C. Waid; Wilson C. Chin; Jimmy Wayne Anders, all of Houston; Mark Proett, Missouri City, all of Tex.

[73] Assignee: Halliburton Energy Services, Inc., Houston, Tex.

[21] Appl. No.: 698,286

[22] Filed: Aug. 14, 1996

Related U.S. Application Data

[63] Continuation of Ser. No. 404,232, Mar. 15, 1995, abandoned.

[51] Int. Cl.[6] ............................. G01F 15/00; G01F 1/05
[52] U.S. Cl. ............................. 73/861.77; 73/861.79
[58] Field of Search ..................... 73/861.77, 861.78, 73/152, 861.28, 861.29, 861.04, 861.79, 152.18, 152.22, 152.34; 367/83, 84

[56] References Cited

U.S. PATENT DOCUMENTS

| | | | |
|---|---|---|---|
| 3,258,963 | 7/1966 | Bryant et al. | 73/861.79 |
| 3,309,656 | 3/1967 | Godbey | 73/152 |
| 3,333,237 | 7/1967 | Chapman, III | 73/152.18 |
| 3,454,085 | 7/1969 | Bostock | 73/152.34 |
| 3,905,226 | 9/1975 | Nicolas | 73/861.79 |
| 4,012,958 | 3/1977 | Taylor | 73/861.77 |
| 4,395,919 | 8/1983 | Peters | 73/861.77 |
| 4,527,425 | 7/1985 | Stockton | 73/861.29 |
| 4,532,812 | 8/1985 | Birchak | 73/861.04 |
| 4,649,756 | 3/1987 | Feller | 73/861.83 |
| 4,733,233 | 3/1988 | Grosso et al. | 73/152.22 |
| 5,375,098 | 12/1994 | Malone et al. | 340/853.1 |
| 5,459,697 | 10/1995 | Chin et al. | 367/81 |
| 5,515,336 | 5/1996 | Chin et al. | 367/83 |
| 5,535,177 | 7/1996 | Chin et al. | 367/81 |
| 5,586,083 | 12/1996 | Chin et al. | 367/84 |
| 5,636,178 | 6/1997 | Ritter | 73/861.79 |

*Primary Examiner*—Hezron E. Williams
*Assistant Examiner*—Harshad Patel
*Attorney, Agent, or Firm*—Conley, Rose & Tayon, P.C.

[57] ABSTRACT

A system for determining fluid flow characteristics and relaying the information to the surface. The system is ideal for use in horizontal or deviated wellbores since orientation of the wellbore with respect to the vertical will not appreciably affect the system's operation. In the described embodiment, a fluid-driven siren flowmeter is placed within a production string downstream of the location of a completion zone, the flowmeter relays representative information downstream via a fluid column to a signal detection assembly. The flowmeter includes a stationary stator, a rotatable rotor and a turbine deflector which is positioned upstream of the rotor and angularly directs the flow of passing fluid to rotate the rotor. In the case of multiple completed zones described, multiple flowmeters are sequentially mounted along the same production string, each providing signals of different characteristics. The flow rates and fluid densities for production from each completion zone may be determined by installing flowmeters just downstream of each completion.

12 Claims, 4 Drawing Sheets

FLUID DRIVEN SIREN FLOWMETER

This application is a continuation of application Ser. No. 08/404,232 filed on Mar. 15, 1995 now abandoned.

BACKGROUND OF THE INVENTION

1. Field of the Invention

The present invention relates to pressure pulse generators, of the "mud siren" type, used in the oil industry to transmit downhole measurement information to the well surface during production operations by way of a fluid column located in a production string or other tubular wellbore member.

2. Description of the Related Art

There are many instances during petroleum production operations where it is desirable to have information regarding fluid flow conditions at points within the wellbore. For example, if production is being obtained from more than one subterranean zone, the well operators will want to know which of the zones are the most and least productive. The least productive zones can be identified and steps taken to improve flow from them or to abandon that zone.

In the logging-while-drilling area, systems are known for transmitting data representative of one or more measured downhole conditions, such as sensed pressure, to the surface. One example is a downhole pressure pulse generator or modulator as described in Godbey, U.S. Pat. No. 3,309,656, which may be operated under electrical power to transmit modulated signals carrying encoded data at acoustic frequencies to the surface by way of the mud column in the drill string. During drilling operations, mud or fluid siren pulse generators are positioned in a drill string near the drill bit and exposed to the circulating mud path.

A typical modulator is composed of a fixed stator and a motor driven rotatable rotor, positioned coaxially of each other. The stator and rotor are each formed with a plurality of block-like radial extensions or lobes spaced circumferentially about a central hub so that the gaps between adjacent lobes present a plurality of openings or ports to the oncoming mud flow stream. Rotation of the rotor relative to the stator in the circulating mud flow produces a cyclic acoustical signal that travels up the fluid column in the drill string to be detected at the drill site surface. It is known to selectively vary the rotation of the rotor to produce frequency, phase and amplitude changes in the acoustic signal. By varying the rotation of the rotor, the pressure pulse produced in the column of drilling mud can be encoded using well known principles to reflect information sensed downhole. The encoded pressure pulses, therefore, carry information from downhole sensors to the surface, where the information is decoded and analyzed. In systems such as this, the information transmitted is determined by the electrically induced modulation of the signal. Sirens such as these are fluid-dynamically balanced so that the velocity of drilling fluid moving relative to the siren does not influence the frequency of the generated signal.

However, only a few devices are known for obtaining information regarding fluid flow characteristics downhole, such as density and flow rate. Existing flowmeters may be used which include a rotatable spinner, the rotation rate of which increases proportionately with the rate of fluid flow past the flowmeter. The flow rate may then be derived based upon the known rotation rate of the spinner. The spinner flowmeter must be placed in the well and the information it provides must be transmitted to the surface by wire or recorded in memory for later retrieval. Unfortunately, such an arrangement is not reliable because the wire connection is vulnerable to breakage and interference during production operations. In addition, a spinner flowmeter may not always indicate the true rate of fluid flow. Flow during production operations is often non-homogenous. In wireline applications, the spinner sometimes tends to lie on one side of the production string and may not see a representative sample of the fluid. In order to optimize the possibility that the spinner flowmeter is measuring a representative sample of the fluid, placement of the flowmeter normally is confined to the downstream end of the production string where the flow tends to be the most homogenous. Because of these limitations, spinner flowmeters are generally of little use in accurately and reliably measuring flow in horizontal or inclined wellbores or in multiphase flow situations where fluid flow characteristics are to be determined at more than one point along the wellbore at any point in time.

SUMMARY OF THE INVENTION

The present invention provides an improved system for determining fluid flow characteristics within a flowbore and relaying such information along the flowbore. In preferred embodiments, the system permits determination of fluid flow characteristics for flow entering a flowbore from multiple flow entry points positioned along the flowbore. The flowmeter, constructed in accordance with the preferred embodiment, transmits information representative of the rate and/or density of fluid flow at each entry point along one or more fluid columns extending from the lowest of the entry points to a location proximate the surface of the wellbore. A signal detection assembly receives the signal. The signal detection assembly preferably includes at least one transducer or other detector and a storage device. In addition to use in vertical wellbores, the system of the present invention also may be used in horizontal or deviated wellbores because orientation of the flowbore with respect to vertical does not affect system operation.

The flowmeter preferably features a stationary stator, a rotatable rotor and a turbine deflector which is positioned upstream of the rotor. The turbine deflector alters the path of flowing fluid in the fluid column and angularly directs the flow to rotate the rotor. In one preferred application, placement of a fluid-driven siren flowmeter within a production string downstream of the location of a completion zone permits the flowmeter to relay representative information downstream via the fluid column to a signal detection assembly.

In the case of multiple completed zones, multiple flowmeters can be sequentially mounted along the same production string. According to the present invention, the flow rates and fluid densities for production from each completion zone are determined by installing flowmeters at or just downstream of each completion.

BRIEF DESCRIPTION OF THE DRAWINGS

The construction, operation, and advantages of the invention can be better understood by referring to the drawings forming a part of the specification, in which.

During the course of the following description, the terms "upstream" and "downstream" are used to denote the relative position of certain components with respect to the direction of flow of fluid within the production string. Thus, where a component is described as upstream from another, it is intended to mean that fluid flows first through that component before flowing through a second component. Similarly, the terms such as "above," "upper," and "below" are used to identify the relative position of components in the borehole, with respect to the distance to the surface of the well, measured along the borehole path.

DESCRIPTION OF THE PREFERRED EMBODIMENTS

Figure 1:
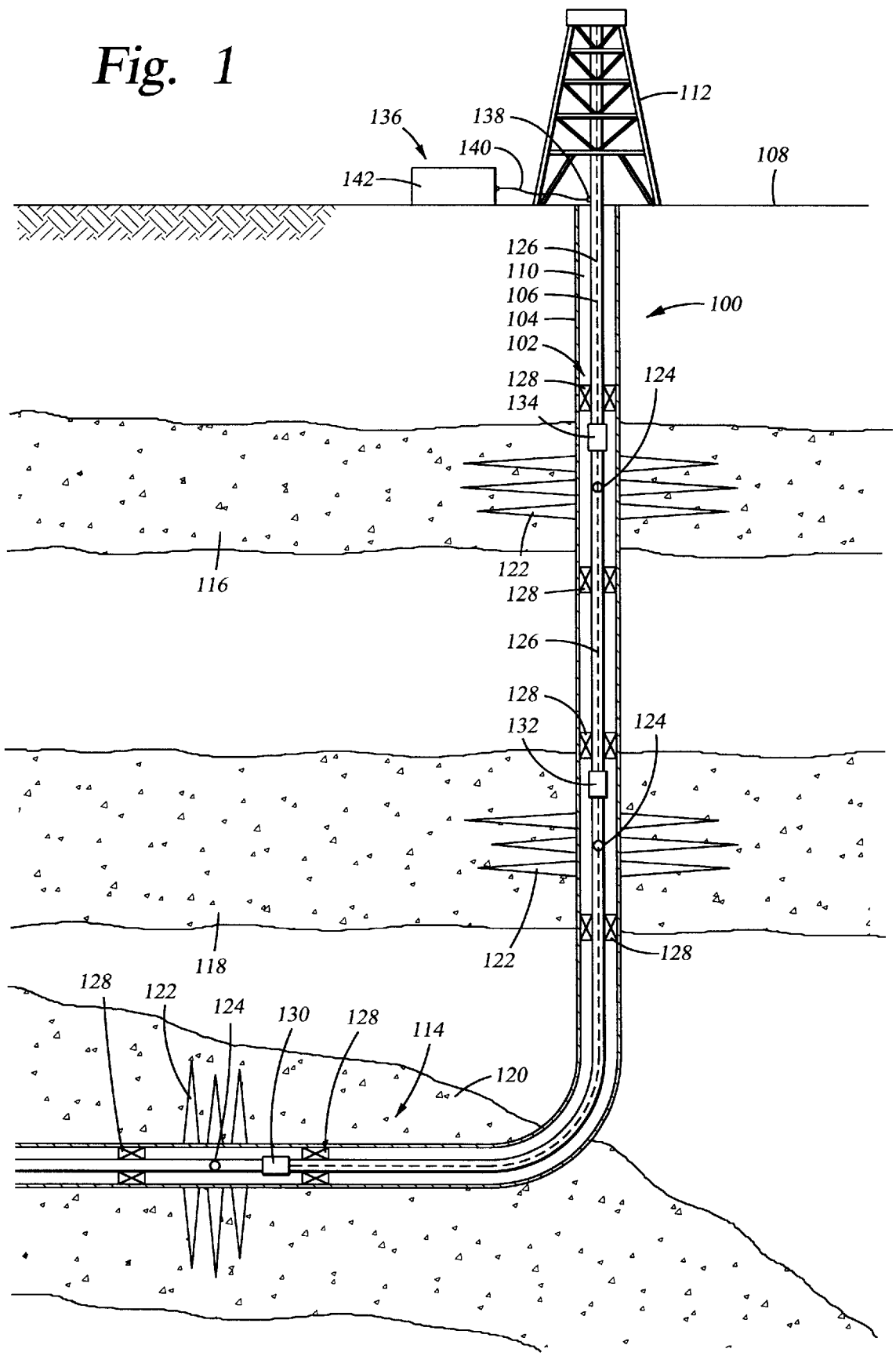
FIG. 1 is an overall schematic view of a number of fluid-driven siren flowmeters in accordance with the present invention, shown coupled in a production string for a typical production operation.

FIG. 1 shows an exemplary petrochemical production arrangement 100 with a subterranean wellbore 102 having an outer casing 104. According to normal convention, tubular production string 106 extends from the surface 108 within the casing 104, defining an annulus 110 between the production string 106 and casing 104. The production string 106 is operably connected to a production wellhead 112 at the surface 108. In accordance with an exemplary embodiment of the present invention, a portion of the wellbore 102 is deviated (as indicated generally at 114).

The wellbore 102 passes through a number of potential producing zones 116, 118 and 120 wherein the casing 104 has been perforated previously by a perforating gun or other suitable perforating device. These perforations are shown schematically at 122. Production nipples 124 within the production string 106 are located proximate each potential producing zone to receive petrochemical fluids from the zones and transmit them into the interior of the production string 106. As a consequence, a fluid column 126 is formed within the production string 106 which extends to the production wellhead 112 above. The fluid column 126 may be thought of as flowing from the production zones 115, 118, 120 at the upstream end to the production wellhead 112 at the downstream end. A number of packers 128 are placed within the annulus 110 above and below each of the production nipples. It is to be understood that FIG. 1 presents a deviated well bore with multiple completion zones for illustrative purposes only. The subject matter of the present invention is suitable for application to vertical wells, as well as wells having single completions. Additionally, the location of production arrangement (subterranean vs. subsea) is not a critical factor to implementation of the present invention.

Along the production string 106, a number of fluid siren flowmeters 130, 132, 134 are positioned proximate to and slightly downstream of a corresponding nipple 124. A signal detection assembly 136 preferably is located proximate the production well head 112. The signal detection assembly includes at least one transducer 138 or other detector, which is operably affixed within the production string 106 at or near the surface 108. When installed, the transducer 138 must be in contact with the fluid column 126 within the production string 106. It is preferred that more than one transducer 138 be used and that the transducers 138 be located at different locations along the production string. This redundant arrangement decreases the likelihood that the transducer will be located at or near a "node" of the production string wherein the signal is incapable of being picked up or detected by the transducer. A wire or other transmission medium, shown schematically at 140, is used to transmit signals received by the transducer to storage device 142. It is to be understood that the transmission medium 140 may include radio, microwave or other electromagnetic carrier wherein the signal will be sent to the storage device 142, even when the storage device 142 is located remotely.

The storage device 142 may include a spectrum analyzer such as the Hi Techniques Model IQ300 Spectrum Analyzer. Alternatively, the storage device 142 may comprise a suitably configured computer such as a personal computer having a data acquisition card, such as the D.A.S.H. 16 sold by Omega Technologies Company at One Omega Drive, P.O. Box 4047, Stamford, Conn. 06907-0047. The computer may also include suitable spectrum analysis software such as Labtech Notebook available from Laboratory Technologies Corporation at 400 Research Drive, Wilmington, Md. 01887.

Figure 2:
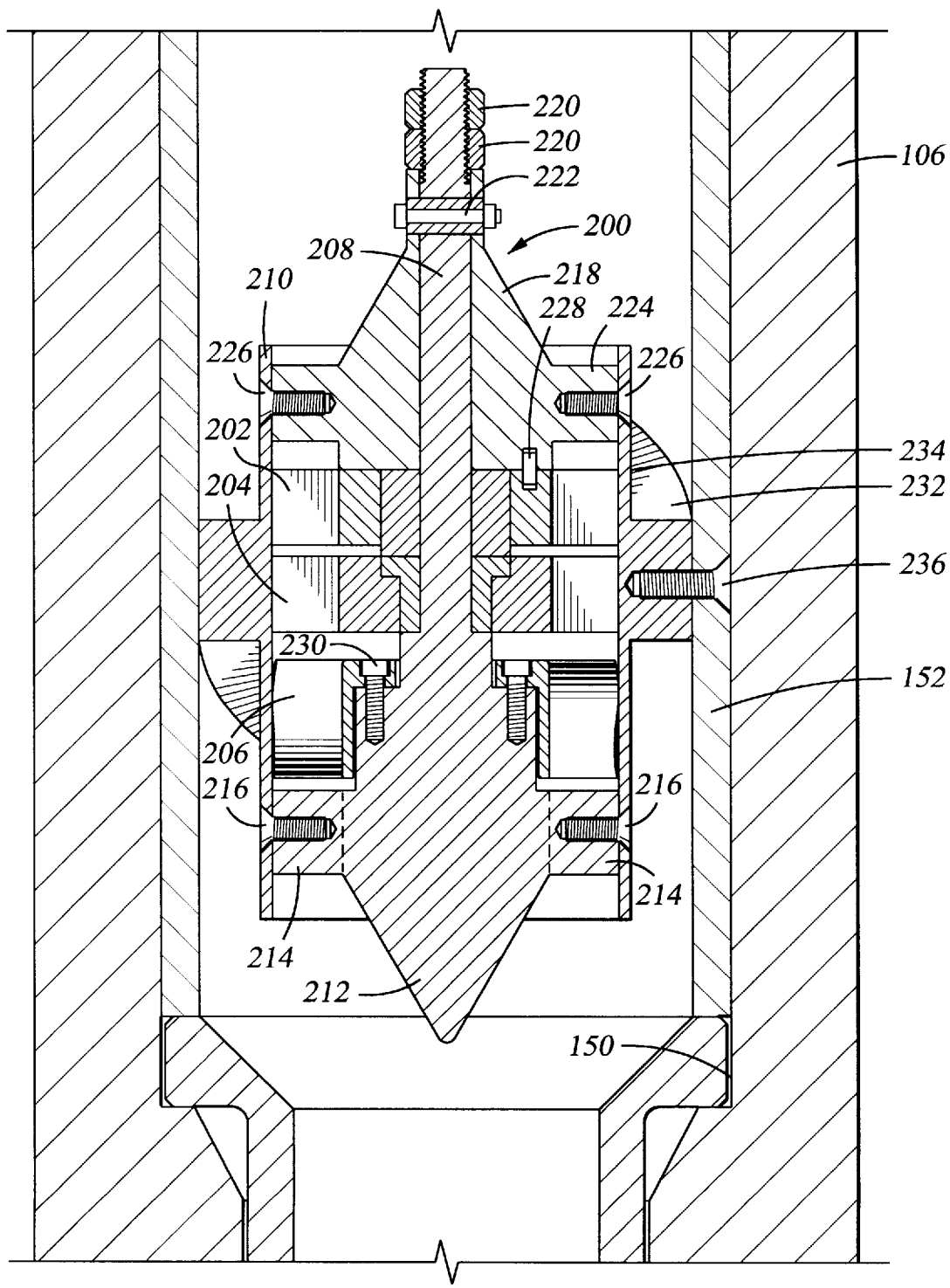
FIG. 2 is a side sectional view of an exemplary fluid-driven siren flowmeter maintained within a wellbore housing.
Figure 3:
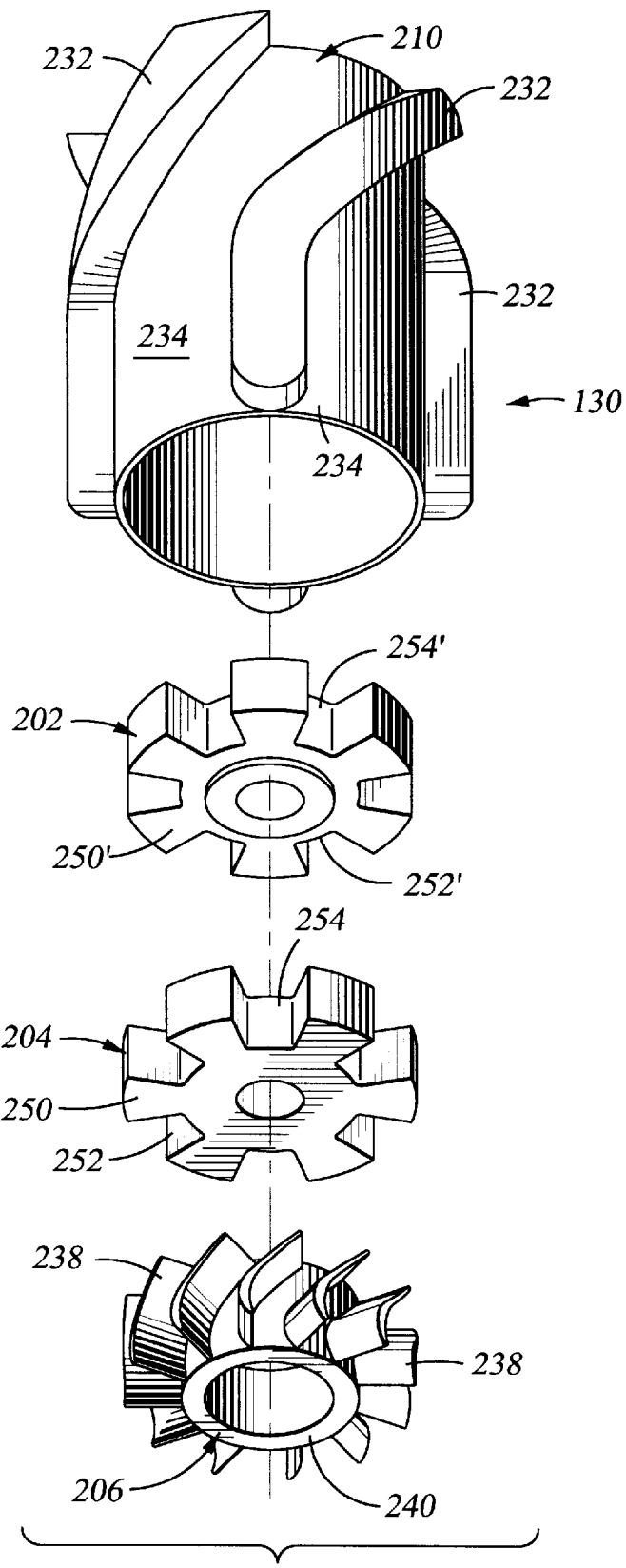
FIG. 3 is an exploded view of an exemplary flowmeter.

Referring now to FIGS. 2 and 3, an exemplary fluid siren flowmeter 200 is shown which is representative of flowmeters 130, 132 and 134 in FIG. 1. the flowmeter 200 is maintained within the production string 106 as shown in FIG. 2 in an enlarged sleeve cavity 150. A tubular sleeve 152 is disposed within the sleeve cavity 150 and radially encloses the flowmeter 200.

The flowmeter 200 preferably comprises a fixed stator 202, a rotatable rotor 204, and a fixed turbine deflector 206 mounted on a central column 208 within a generally cylindrical modular housing 210. The central column 208 includes an enlarged lower portion 212, with a pair of lateral arms 214 extending outwardly therefrom. Set screws 216 preferably affix the housing 210 to the lateral arms 214. An upper enlarged collar 218 mounts coaxially at the upper end of the central column 208. The collar 218 is held in place by one or more nuts 220 threaded onto the upper end of the central column 208 and/or a screw-and-nut arrangement which passes through the columns 208 above the collar. The enlarged collar 218 also presents a pair of lateral arms 224 extending outwardly and affixed to the housing 210 by set screws 226. In the exemplary embodiment of FIG. 2, a dowel pin 228 pins the stator 202 to the enlarged collar 218. The turbine deflector 206 fixedly connects to the enlarged lower portion 212 of the central column 208 by pins or screws 230.

A plurality of raised splines 232 preferably are located on the outside of the housing 210. Between each raised spline resides an intermediate recess 234. The splines 232 permit attachment of the housing 210 to sleeve 152 by one or more set screws 236. Fluid can flow along the intermediate recesses 234 between the housing 210 and the sleeve 152.

As best shown in FIG. 3, the turbine deflector 206 includes a number of curved fins 238 extending radially outward from a central hub 240. In the preferred embodiment, the upstream end of the fins 238 are aligned virtually in parallel to the axis of the deflector 206 and curve along their longitudinal length to achieve a bend of approximately 45° from the deflector axis at the fins' downstream end.

During a production operation, production fluid in the fluid column 126 flows downstream through the production string 106. The flow enters a flowmeter 200 and is deflected by the turbine deflector 206, causing the rotor 204 to rotate relative to the stator 202 and producing pressure pulsing in the column 126 of production fluid that can be detected at the surface by the signal detection assembly 136, according to conventional techniques. Passage of the fluid column 126 through the flowmeter 200 serves to mix the fluid, creating a substantially homogenous and uniform mix.

By monitoring signal amplitude and frequency, it is possible to determine both the rate of fluid flow and the density of fluid being passed by a flowmeter of a particular configuration. The angular velocity of the rotor 204, and thus the frequency of the generated signal is a function of the velocity of the fluid flowing through the flowmeter. The greater the rate of the fluid flow, the higher the frequency of the generated signal. As the generated frequency depends upon the sizes and geometrical configuration of the particular flowmeter's components, it is important that the flowmeter be calibrated prior to use so that the frequencies received by the signal detection assembly 136 can be meaningfully interpreted back into flow rates. A factory calibration preferably is performed by the manufacturer or vendor of the flowmeter and the results included as data tables for use by the well operators. However, field tests of a particular flowmeter or flowmeters may be conducted in lieu of or in addition to the factory calibration, if desired. Calibration can be done by using a wind tunnel and suitable measurement apparatus to match particular fluid flow rates with the rotor rotation rates and frequencies generated by the particular flowmeter. A representative data table for such a flowmeter is now presented which illustrates the rotor rotation rates (in rotations per minute) and signal frequencies (in Hertz) measured during wind tunnel testing of a particular flowmeter in which various volumes of air (in gallons per minute) were passed through the flowmeter.

| Fluid Flow (GPM) | Rotor Rotation Rate (RPM) | Signal Frequency (Hz) |
|---|---|---|
| 150 | 300 | 1800 |
| 250 | 830 | 4980 |
| 350 | 1210 | 7260 |
| 450 | 1795 | 10800 |
| 550 | 2100 | 12600 |
| 650 | 2390 | 14400 |
| 750 | 2600 | 15600 |
| 850 | 3000 | 18000 |
| 950 | 3375 | 20250 |
| 1050 | 3565 | 21400 |

The frequency data obtained in the wind tunnel can then be applied to situations involving thicker fluids since the relationship between flow rate and frequency does not depend upon fluid density or viscosity.

It is further noted that the density of the fluid flowing through a flowmeter affects the amplitude of the generated signal. The greater the fluid density, the greater the signal amplitude. As was true with regard to the relationship between flow rate and frequency, the density/amplitude relationship may be tested and calibration prior to actual use. Measured amplitudes under field operation conditions can be compared to that obtained using air in the wind tunnel tests. If, for example, the signal amplitude obtained is 1,000 times as great as that obtained using air, the fluid flowing through the flowmeter is expected to have a density which is 1,000 times that of air.

FIG. 1 presents a multiphase flow situation, in which fluid is produced from a number of production zones simultaneously. As will now be described, the invention may be employed to determine the fluid density and rate of fluid flow proximate each production zone. With this information, operators may approximate which production zones are producing at the highest and lowest rates and may obtain information regarding the types of fluids (i.e., a dense crude vs. a lighter gas) produced from each zone. The storage device 142 is capable of parsing the combined signal generated by all operating flowmeters into separate signals representative of each individual flowmeter.

In this type of multiflow situation, wherein flow is expected to enter a flowpath from multiple flow entry points along the path, each of the flowmeters 130, 132, and 134 preferably are constructed identically so as to provide signals having substantially the same characteristics as the other flowmeters, thus enabling the signal detection assembly 136 to readily sort the combined signal provided by all operating flowmeters into component signals.

Figures 4A, 5A:
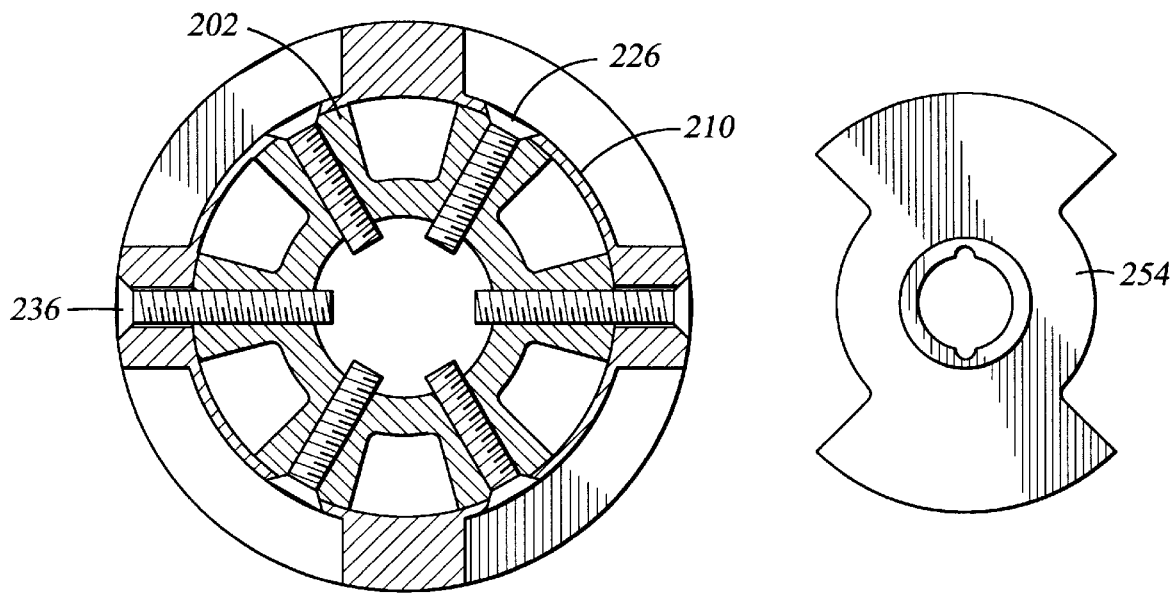
FIGS. 4A–4B are top elevations of a rotor and stator of a flowmeter that are configured with six lobes and six ports.
FIGS. 5A–5B depict alternate configurations of a rotor of the flowmeter configured with two and three lobes, respectively.
Figures 4B, 5B:
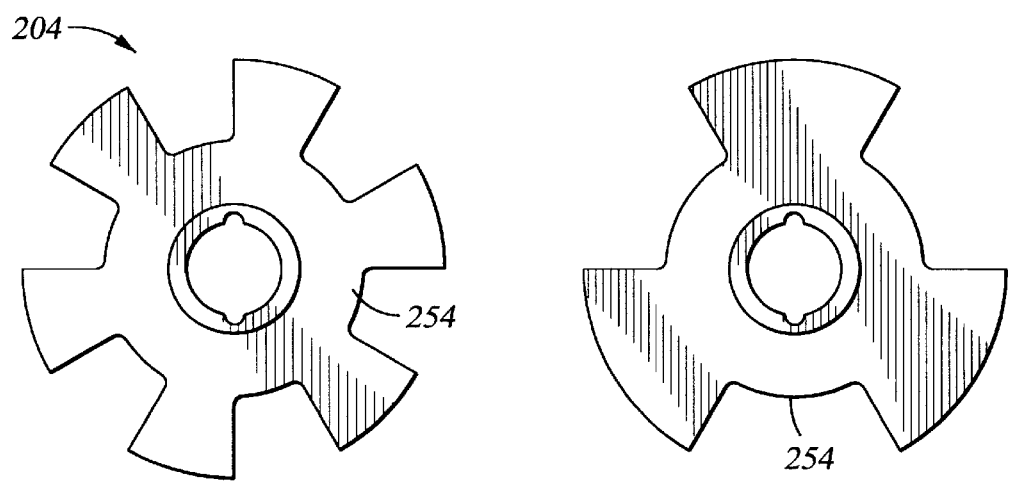

In the preferred embodiment of the present invention, the stator and rotor generally have the same configuration and dimensions. In addition, and as shown, for example, in FIGS. 3, 4A, 4B, 5A and 5B, the lobes and ports of the rotor and stator preferably are configured with substantially the same surface area facing the fluid stream. Thus, as seen in FIG. 5B for a three lobe configuration, both the lobes and the ports each extend along an arc of 60° from the central hub section 254. The number of lobes on the rotor 204 and stator 202 define the number of pulses that well be generated during one revolution of the rotor 204. Thus, for example, if the rotor and stator have six lobes, then six pressure pulses are generated in one revolution of the rotor. As will be understood by one skilled in the art, the signal characteristics of the flowmeter can be altered by changing the number of lobes and ports on each stator and rotor combination. Thus, if one flowmeter is used with six lobes and ports on the rotor and stator, it will have a modulated signal with twice the frequency of a flowmeter with three lobes and ports on the rotor and stator. The preferred dimensions of the rotors as shown in FIGS. 4B (six lobes), 5A (two lobes) and 5B (three lobes) are as follows:

TABLE 1

(PREFERRED DIMENSIONS)

Rotor With 6 Lobes

Diameter of hub section = 1.72"
Inner diameter = 0.6257"
Angular width of lobes = 30°
Angular width of ports = 30°
Depth of lobes = 0.546"

Rotor with 2 Lobes

Diameter of hub section = 1.72"
Inner diameter = 0.6257"
Angular width of lobes = 90°
Angular width of parts = 90°
Depth of lobes = 0.538"

Rotor with 3 Lobes

Diameter of hub section = 1.72"
Inner diameter = 0.6257"
Angular width of lobes = 60°
Angular width of ports = 60°
Depth of lobes = 0.537"

These dimensions are only meant to be illustrative of the preferred embodiment and should not be construed as a limitation on the number and dimensions of the rotor and stator configurations.

During petrochemical production by the production arrangement 100, the flowmeter 134 which is the furthest downstream will create a signal which has the highest frequency of all of the flowmeters 130, 132 and 134 because the total amount of fluid entering the production string 106 will pass through it. Conversely, the flowmeter 130 which is the furthest upstream will generate the lowest frequency since it will encounter the lowest flowrate. The intermediate flowmeter 132, of course, will generate a frequency which is between that generated by flowmeters 130 and 134. The signal detection assembly 136 will detect a plurality of signal frequencies, each corresponding to a particular flowmeter. Because flow rates are proportional to frequency, the difference in frequency between two such signals is indicative of the difference in flow rate between the two points at which flow is being measured. Moreover, the measured amplitude at each points will be indicative of the average fluid density at each of that point.

It will, therefore, be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such embodiments, adaptations, variations, modifications and equivalent arrangements, the present invention being limited only by the claims appended hereto and the equivalents thereof.

We claim:

1. A system for determining the flow rate of a fluid within a fluid column, comprising:
    (a) a fluid siren flowmeter within the fluid column which is actuated by fluid flow to produce an acoustic signal within fluid within the fluid column having a frequency related to the rate of flow of fluid through the flowmeter, whereby the acoustic signal is carried solely by the fluid to a signal detection arrangement; and
    (b) said signal detection arrangement detecting said signal for determining the flow rate.

2. The system of claim 1 wherein the flowmeter comprises:
    (a) a housing defining an inner cylindrical bore for fluid flow therethrough;
    (b) a rotatable rotor mounted within said housing;
    (c) a stationary stator mounted within said housing; and
    (d) a flow deflector mounted within said housing which deflects fluid flow through the flowmeter to rotate the rotor with respect to the stator.

3. The system of claim 2 wherein the signal detection arrangement comprises a spectrum analyzer.

4. The system of claim 2 wherein the signal detection arrangement comprises a computer.

5. A method for determining the flow rate of a fluid comprising the steps of:
    (a) flowing fluid past a flowmeter to actuate the flowmeter to produce an acoustic signal within fluid within a fluid column having a frequency representative of the rate of flow of the fluid, said signal to be carried solely by the fluid;
    (b) detecting said signal.

6. The method of claim 5 further comprising the step of deriving the rate of flow of the fluid from the frequency of the signal.

7. A method for determining the flow rate of a fluid within a fluid column comprising the steps of:
    (a) flowing fluid within the fluid column past a flowmeter to actuate the flowmeter to produce an acoustic signal within fluid within the fluid column having a frequency representative of the rate of flow of the fluid, said signal to be carried solely by the fluid;
    (b) detecting said signal.

8. The method of claim 7 further comprising the step of deriving the rate of flow of the fluid from the frequency of the signal.

9. An apparatus for determining information representative of fluid flow into the flowpath of a flowbore from at least one fluid flow entry point along the flowbore, the apparatus comprising:
    a flowmeter located within said flowbore downstream along the flowpath from said fluid flow entry point, the flowmeter being actuated by fluid flow to produce an acoustic signal within fluid within said flowbore representative of fluid flow information proximate said entry point, said signal to be carried solely by the fluid;
    means for receiving said signal.

10. The apparatus of claim 9 wherein said fluid flow information comprises the rate of fluid flow.

11. An apparatus for determining the flow rate of a fluid within a flowbore, comprising a fluid siren flowmeter which is actuated by fluid flowing through the flowbore to produce an acoustic signal within fluid within the flowbore related to the rate of flow of fluid, said signal to be carried solely by the fluid.

12. The apparatus of claim 11 further comprising a signal detection arrangement for detecting said signal so that the flow rate may be determined.

* * * * *